No. 11,749. Reissued June 13, 1899.

D. KNOWLTON.

MATCH SAFE.

Application filed Apr. 17, 1899.)

Witnesses:
J. M. Fowler Jr.
F. E. Newton.

Inventor
Dallas Knowlton
by Joseph N. Bull
his Attorney

UNITED STATES PATENT OFFICE.

DALLAS KNOWLTON, OF WASHINGTON, DISTRICT OF COLUMBIA.

MATCH-SAFE.

SPECIFICATION forming part of Reissued Letters Patent No. 11,749, dated June 13, 1899.

Original No. 602,624, dated April 19, 1898. Application for reissue filed April 17, 1899. Serial No. 713,417.

*To all whom it may concern:*

Be it known that I, DALLAS KNOWLTON, a citizen of the United States residing at Washington, in the District of Columbia, have invented certain new and useful Improvements in Match-Safes; and I do hereby declare the following to be a full, clear, and exact description of the invention, such as will enable others skilled in the art to which it appertains to make and use the same.

My invention relates to improvements in match-safes; and the object is to provide a device for holding and delivering one match at a time, as occasion requires for their use.

To this end the invention, generally stated, consists in so presenting the article to be vended that when brought into operative position its longitudinal axis is inclined to the longitudinal axis of a receptacle or cut-off in a withdrawing device that is adapted to be passed in a plane directly beneath the article to be vended.

Figure 1:
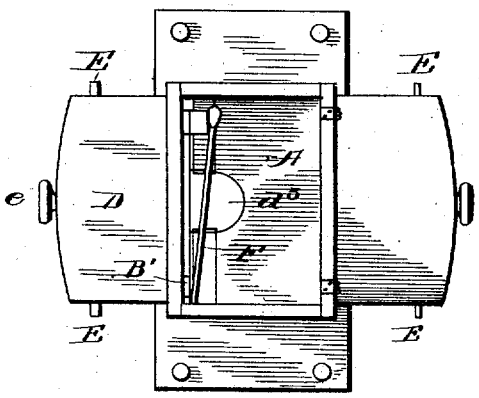
Figure 2:
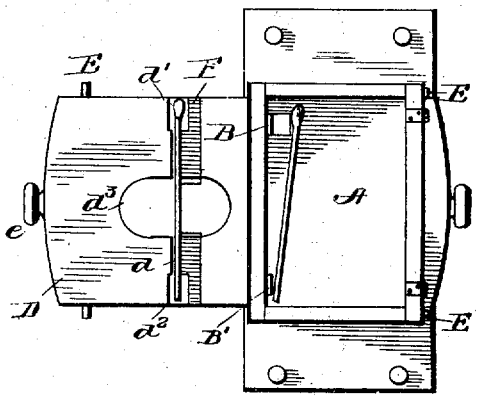
Figure 3:
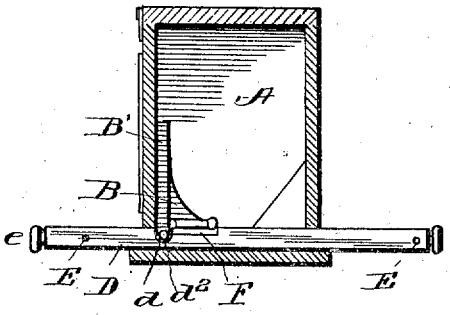
Figure 4:
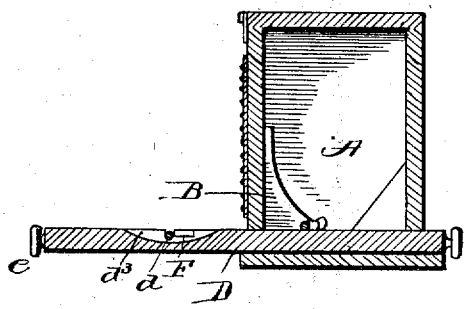

In the accompanying drawings, to which reference is had and which illustrate one species of my invention, Figure 1 is a top plan view with a match in position to be drawn out by a slide. Fig. 2 is a similar view showing a match in the groove with the slide drawn out. Fig. 3 is a sectional elevation showing the slide in its normal position, and Fig. 4 is a similar view showing the slide drawn out.

Referring to the drawings, A designates a receptacle for matches, which may be mounted and secured upon a pedestal or any suitable base.

B and B′ designate guards, made of rubber or other material, one of which, B, is of wedge-shape form, and the other, B′, of rectangular form the latter being thinner than B and both being secured to the inner side of the front wall of the receptacle in a vertical position, as clearly shown in the drawings.

D designates a slide having a transverse groove *d* formed in the upper face thereof, this groove terminating, preferably, in enlargements $d'$ and $d^2$ for the reception of the heads of the matches and intersecting a thumb-piece or depression $d^3$, formed centrally in the slide D.

E designates stops secured upon the edges near the ends of the slide, by which means the movement of the slide is limited, a pull or push button *e* being secured to each end of the slide for operating the same.

F designates two pieces of rubber or other soft material secured upon the upper face of the slide D and in the rear of the groove *d*, which are arranged transversely with the guards B and B′ and which when brought in proximity to said guards provide a soft contact for a match lying against said guards, thereby preventing the ignition of the match-head.

The function of the wedge-shaped guard B and rectangular guard B′, disposed as shown, is twofold. First, it admits of the angular presentment of the match to be delivered to the groove *d*, whereby the match is allowed to drop endwise into the groove in the manner of a shear or diagonal movement, the match thus yielding to gravity in a way to receive the aiding pressure of the other matches in the receptacle without exposing same to their interference, and, second, it prevents any match from being caught in the groove *d* when another match is lying seated therein by causing a shearing or angular movement of the nearest interfering match in the receptacle A as the slide is drawn back and forth, thus arresting one end thereof as the slide moves forward before the other end of the match comes in contact with the thin or rectangular guard.

What I claim as new, and desire to secure by Letters Patent, is—

1. In a safe or analogous device, a receptacle, a slide having a receiving-groove formed therein, and means whereby the articles held in such receptacle are presented to such groove in such position that the longitudinal axis of the article is inclined to the longitudinal axis of the groove.

2. In a match-safe, the combination of a receptacle having a transverse slide passing through slots in the walls of said receptacle and provided with a match-retaining groove rubber strips secured to the rear edge of said match-retaining groove and two rubber blocks secured to the inner wall of the receptacle and extending over the edge of the front slot.

3. In a match-safe the combination of a receptacle having a transverse slide passing through slots in the walls of said receptacle and provided with a match-retaining groove having enlarged ends for receiving the heads of the matches and provided with rubber strips secured to the rear edge of said match-retaining groove and two rubber blocks of different thicknesses secured to the inner wall of the receptacle and extending over the edge of the front slot thereby preventing the matches from becoming locked between the receptacle and the edge of the slot.

In testimony whereof I affix my signature in presence of two witnesses.

DALLAS KNOWLTON.

Witnesses:

ADDISON G. DU BOIS,
GEO. E. DUNSTER.